Jan. 10, 1939.  F. M. WARING  2,143,461
MEANS FOR PREVENTING SOIL EROSION
Filed July 28, 1937
Fig. 1.
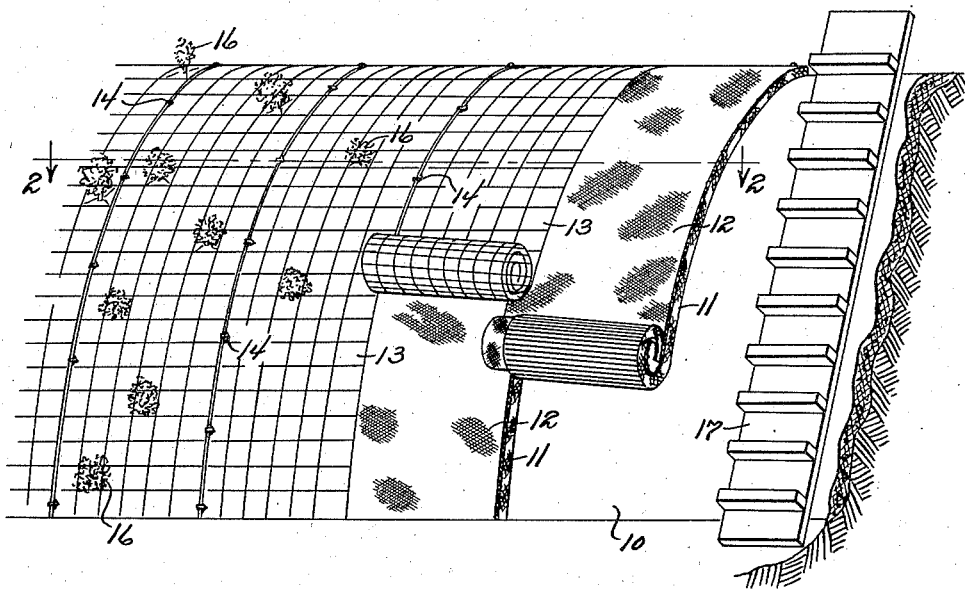
Fig. 2.
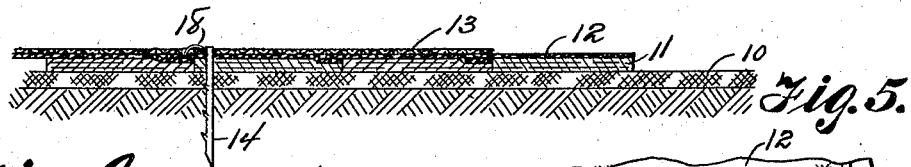
Fig. 4. Fig. 3. Fig. 5.
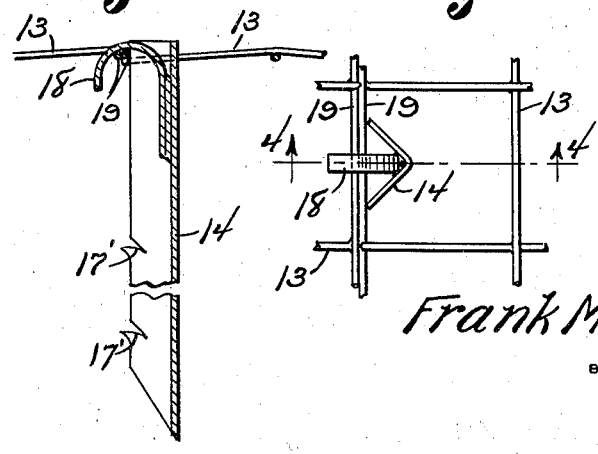
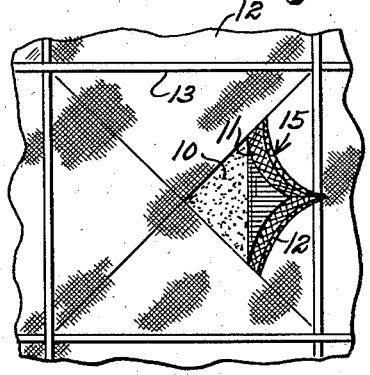
Frank M. Waring  INVENTOR
BY Victor J. Evans & Co.
ATTORNEYS Patented Jan. 10, 1939

2,143,461

UNITED STATES PATENT OFFICE 2,143,461

MEANS FOR PREVENTING SOIL EROSION

Frank M. Waring, Harrisburg, Pa.

Application July 28, 1937, Serial No. 156,201

1 Claim. (Cl. 47—9)

This invention relates to a means for preventing soil erosion and has for an object to provide a novel means for protecting plant growth on slopes, banks, terraces, hills, cuts, fills, dikes and levees, where, due to the direct beat of rain and wind storms, sun, freezing and thawing, erosive forces have made the establishment of root formation and a completely covering protective growth impossible.

The invention contemplates insulating such slopes against the above and all erosive forces by the application of a mulch of litter with a protective thatch and binder all of sufficient porosity for aeration and to admit sufficient rain by a controlled slow trickle, the cover matching in character and purpose, the matted floor of the forest.

The invention further contemplates firmly securing the mulch cover, through which shrubs, plants, vines and trees may be planted, and by it protected and nurtured with sufficient moisture constantly available for a strong and speedy root formation and an early covering of the entire surface by a luxuriant growth of vegetation best adapted to the particular soil and climate involved.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a perspective view showing the application of the invention for protecting a slope.

Figure 2 is a longitudinal sectional view taken on the line 2—2 of Figure 1.

Figure 3 is a detail plan view showing one of the stakes for pegging the wire mesh layer to the ground.

Figure 4 is a cross sectional view taken on the line 4—4 of Figure 3.

Figure 5 is an enlarged detail plan view of the covering with a portion disrupted to permit a plant being planted.

Referring now to the drawing in which like characters of reference designate similar parts in the various views, the method and apparatus comprising the subject matter of this invention is shown to comprise covering the slope with a mulch of litter 10, placing straw 11, attached to the underneath side of porous burlap 12, over the mulch, and placing wire mesh material 13 over the burlap. Stakes 14 are driven through the wire mesh material, burlap, straw and mulch into the ground to hold the protective covering firmly in place.

Portions 15 of the burlap and attached straw within certain meshes of the wire mesh material, as best shown in Figure 5, are cut from the center of the meshes to the corners thereof. The triangular portions thus formed are folded backwardly so as to gain access to the underlying mulch and soil. Holes are then dug for the plants 16 that are to be used. After the plants have been set, and the soil placed back in the holes the mulch and the triangular portions of the burlap are returned to their normal positions.

One application of the method consists of placing a suitable ladder 17 against the slope and working from the top downward. Rolls or mats of the straw and burlap material several inches thick and about a yard wide, are placed or rolled down the slope closely followed by a roll of the wire mesh material, preferably of six inch mesh, which has been first staked or pegged at the top of the slope. The stakes are then driven in and bind the covering permanently to the ground.

Each stake preferably is formed from angle iron, the legs of which are mutilated to form anchoring spurs 17' which prevent the stakes from working back out of the ground. Each stake is provided with a hook 18 at the top to straddle longitudinal wires 19 of adjacent rolls of the wire mesh material as best shown in Figure 3.

The permanent protective covering creates a moist soil of uniform consistency and porosity so essential to rapid plant growth. The planting is all done through the protective covering after it has been laid and firmly stacked to the slope, leaving the plant tops protruding to the sun light. Of course, the depth and the material of the mulch and the covering may vary greatly as to climate, soil, and materials available.

From the above description it is thought that the construction and operation of the invention will be fully understood without further explanation.

What is claimed is:

Apparatus for preventing soil erosion comprising a mulch of litter, straw attached to the underneath side of porous burlap superposed upon the mulch, wire mesh material superposed upon the burlap, stakes engaged through the wire mesh material, through the burlap, through the straw and adapted to be driven into the ground, said stakes being of angle iron construction and having the legs mutilated on the outer edges to provide upwardly and outwardly extending anchoring spurs, and hooks on the upper ends of the stakes straddling the wire mesh material.

FRANK M. WARING.